(12) United States Patent
Koyfman

(10) Patent No.: US 7,519,835 B2
(45) Date of Patent: Apr. 14, 2009

(54) ENCRYPTED TABLE INDEXES AND SEARCHING ENCRYPTED TABLES

(75) Inventor: Andrew Koyfman, San Francisco, CA (US)

(73) Assignee: SafeNet, Inc., Belcamp, MD (US)

( * ) Notice: Subject to any disclaimer, the term of this patent is extended or adjusted under 35 U.S.C. 154(b) by 449 days.

(21) Appl. No.: 10/850,827

(22) Filed: May 20, 2004

(65) Prior Publication Data
US 2006/0041533 A1    Feb. 23, 2006

(51) Int. Cl.
*H04L 9/00*     (2006.01)
*H04K 1/00*     (2006.01)
*G06F 17/30*    (2006.01)
*G06F 7/00*     (2006.01)
*G06F 21/00*    (2006.01)

(52) U.S. Cl. ............................... 713/193; 707/7; 707/9
(58) Field of Classification Search ............... None
See application file for complete search history.

(56) References Cited

U.S. PATENT DOCUMENTS

| | | | |
|---|---|---|---|
| 4,386,416 A | 5/1983 | Giltner | |
| 4,964,164 A | 10/1990 | Fiat | |
| 5,142,272 A | 8/1992 | Kondo | |
| 5,222,133 A | 6/1993 | Chou et al. | |
| 5,463,702 A | 10/1995 | Trueblood | |
| 5,557,712 A | 9/1996 | Guay | |
| 5,734,744 A | 3/1998 | Wittenstein et al. | |
| 5,764,235 A | 6/1998 | Hunt et al. | |
| 5,825,884 A | 10/1998 | Zdepski et al. | |
| 5,825,917 A | 10/1998 | Suzuki | |
| 5,828,832 A | 10/1998 | Holden et al. | |
| 5,848,159 A | 12/1998 | Collins et al. | |
| 5,923,756 A | 7/1999 | Shambroom | |
| 5,963,642 A * | 10/1999 | Goldstein | 713/193 |
| 5,999,629 A | 12/1999 | Heer et al. | |
| 6,021,198 A | 2/2000 | Anigbogu | |
| 6,061,448 A | 5/2000 | Smith et al. | |
| 6,073,242 A | 6/2000 | Hardy et al. | |
| 6,081,598 A | 6/2000 | Dai | |
| 6,081,900 A | 6/2000 | Subramaniam et al. | |
| 6,094,485 A | 7/2000 | Weinstein et al. | |
| 6,098,093 A | 8/2000 | Bayeh | |
| 6,098,096 A | 8/2000 | Tsirigotis et al. | |

(Continued)

FOREIGN PATENT DOCUMENTS

| | | |
|---|---|---|
| EP | 0 946 018 | 9/1999 |
| WO | WO 01/03398 | 1/2001 |
| WO | WO 02/101605 | 12/2002 |

OTHER PUBLICATIONS

U.S. Appl. No. 11/341,060, filed Jan. 27, 2006, Metzger et al.

(Continued)

*Primary Examiner*—Christopher A Revak
(74) *Attorney, Agent, or Firm*—Drinker, Biddle & Reath LLP

(57) ABSTRACT

The present invention teaches a variety of methods for building and searching secure, indexed database tables. Sensitive portions of the database tables and database indexes are encrypted, ordered and searched according to Boolean functions arranged to work with encrypted data. Also disclosed is a database management system that allows authorized users to build and search encrypted tables.

17 Claims, 5 Drawing Sheets

U.S. PATENT DOCUMENTS

| | | | |
|---|---|---|---|
| 6,105,012 | A | 8/2000 | Chang et al. |
| 6,154,542 | A | 11/2000 | Crandall |
| 6,202,157 | B1 | 3/2001 | Brownlie et al. |
| 6,216,212 | B1 | 4/2001 | Challenger et al. |
| 6,233,565 | B1 | 5/2001 | Lewis et al. |
| 6,233,577 | B1 | 5/2001 | Ramasubramani et al. |
| 6,237,033 | B1 | 5/2001 | Doeberl et al. |
| 6,321,201 | B1 | 11/2001 | Dahl |
| 6,396,926 | B1 | 5/2002 | Takagi et al. |
| 6,397,330 | B1 | 5/2002 | Elgamal et al. |
| 6,442,607 | B1 | 8/2002 | Korn et al. |
| 6,473,802 | B2 | 10/2002 | Masters |
| 6,477,646 | B1 | 11/2002 | Krishna et al. |
| 6,502,135 | B1 | 12/2002 | Munger et al. |
| 6,519,365 | B2 | 2/2003 | Kondo et al. |
| 6,553,393 | B1 | 4/2003 | Eilbott et al. |
| 6,578,061 | B1 | 6/2003 | Aoki et al. |
| 6,584,567 | B1 | 6/2003 | Bellwood et al. |
| 6,587,866 | B1 | 7/2003 | Modi et al. |
| 6,598,167 | B2 | 7/2003 | Devine et al. |
| 6,615,276 | B1 | 9/2003 | Mastrianni et al. |
| 6,621,505 | B1 | 9/2003 | Beauchamp |
| 6,640,302 | B1 | 10/2003 | Subramaniam et al. |
| 6,678,733 | B1 | 1/2004 | Brown et al. |
| 6,681,327 | B1 | 1/2004 | Jardin |
| 6,751,677 | B1 | 6/2004 | Ilkicki et al. |
| 6,757,823 | B1 | 6/2004 | Rao et al. |
| 6,763,459 | B1 | 7/2004 | Corella |
| 6,785,810 | B1 | 8/2004 | Lirov et al. |
| 6,874,089 | B2 | 3/2005 | Dick et al. |
| 6,886,095 | B1 | 4/2005 | Hind et al. |
| 6,915,427 | B2 | 7/2005 | Maruyama et al. |
| 6,917,614 | B1 * | 7/2005 | Laubach et al. ............. 370/392 |
| 6,941,459 | B1 | 9/2005 | Hind et al. |
| 6,963,980 | B1 | 11/2005 | Mattsson |
| 6,990,636 | B2 | 1/2006 | Beauchamp |
| 6,990,660 | B2 | 1/2006 | Moshir et al. |
| 7,137,143 | B2 | 11/2006 | Chawla et al. |
| 7,152,244 | B2 | 12/2006 | Toomey |
| 7,266,699 | B2 | 9/2007 | Newman et al. |
| 7,272,229 | B2 * | 9/2007 | Nakano et al. ............. 380/277 |
| 7,325,129 | B1 | 1/2008 | Mattsson et al. |
| 2002/0012473 | A1 | 1/2002 | Kondo et al. |
| 2002/0015497 | A1 | 2/2002 | Maruyama et al. |
| 2002/0016911 | A1 | 2/2002 | Chawla et al. |
| 2002/0039420 | A1 | 4/2002 | Shacham et al. |
| 2002/0066038 | A1 | 5/2002 | Mattsson et al. |
| 2002/0073232 | A1 | 6/2002 | Hong et al. |
| 2002/0087884 | A1 | 7/2002 | Shacham et al. |
| 2002/0100036 | A1 | 7/2002 | Moshir et al. |
| 2002/0112167 | A1 | 8/2002 | Boneh et al. |
| 2003/0014650 | A1 | 1/2003 | Freed et al. |
| 2003/0039362 | A1 * | 2/2003 | Califano et al. ............. 380/283 |
| 2003/0046572 | A1 * | 3/2003 | Newman et al. ............ 713/193 |
| 2003/0065919 | A1 | 4/2003 | Albert et al. |
| 2003/0068047 | A1 * | 4/2003 | Lee et al. .................... 380/278 |
| 2003/0097428 | A1 | 5/2003 | Afkhami |
| 2003/0101355 | A1 | 5/2003 | Mattsson |
| 2003/0123671 | A1 | 7/2003 | He et al. |
| 2003/0156719 | A1 | 8/2003 | Cronce |
| 2003/0197733 | A1 | 10/2003 | Beauchamp et al. |
| 2003/0204513 | A1 | 10/2003 | Bumbulis |
| 2004/0015725 | A1 | 1/2004 | Boneh et al. |
| 2004/0255140 | A1 * | 12/2004 | Margolus et al. ............ 713/193 |
| 2005/0004924 | A1 * | 1/2005 | Baldwin ..................... 707/100 |
| 2006/0031873 | A1 * | 2/2006 | Fahrny et al. ................. 725/31 |
| 2006/0041533 | A1 | 2/2006 | Koyfman |
| 2006/0149962 | A1 | 7/2006 | Fountain et al. |
| 2007/0055877 | A1 * | 3/2007 | Persson et al. ............. 713/171 |
| 2007/0074047 | A1 | 3/2007 | Metzger et al. |
| 2007/0078866 | A1 * | 4/2007 | Takashima ................. 707/100 |
| 2007/0079140 | A1 | 4/2007 | Metzger et al. |
| 2007/0079386 | A1 | 4/2007 | Metzger et al. |
| 2007/0109124 | A1 * | 5/2007 | Park et al. ................. 340/572.1 |
| 2007/0176744 | A1 * | 8/2007 | Park et al. .................. 370/10.1 |

OTHER PUBLICATIONS

U.S. Appl. No. 10/526,252, filed Feb. 24, 2005, Fountain et al.
U.S. Appl. No. 11/236,046, filed Sep. 26, 2005, Metzger et al.
U.S. Appl. No. 11/236,294, filed Sep. 26, 2005, Metzger et al.
U.S. Appl. No. 11/236,061, filed Sep. 26, 2005, Metzger et al.
Menezes, A., et al., "Handbook of Applied Cryptography," 1996 CRC Press, pp. §8.2-8.3 and §14.5.
Netscape; "Netscape Proxy Server Administrator's Guide, Version 3.5 for Unix"; Feb. 25, 1998; Retrieved from the Internet.
Oppliger, R.; "Authorization Methods for E-Commerce Applications"; 1999.
RSA Laboratories: "PKCS #7: Cryptographic Message Syntax Standard, Version 1.5," RSA Laboratories Technical Note, pp. 1-30, Nov. 1, 1993.
RSA "PKCS #1 v2.0 Amendment 1: Multi-Prime RSA," 2000.
"Security Protocols Overview (An RSA Data Security Brief)", RSA Data Security, 1999, http://www.comms.scitech.susx.ac.uk/fft/crypto/security_protocols.pdf, pp. 1-4.
Schacham, H., et al., "Improving SSL Handsake Performance via Batching," Topics in Cryptology, pp. 28-43, 2001.
Shand, M., et al., "Fast Implementations of RSA Cryptography," 1993.
Sherif, M.H., et al., "SET and SSL: Electronic Payments on the Internet," IEEE, pp. 353-358 (1998).
Stallings, W., "IP Security," Network Security Essentials, Applications and Standards, Chapters 6 and 7, pp. 162-223, 2000.
Takagi, T., "Fast RSA-Type Cryptosystem Modulo $p^k q$," 1998.
Takagi, T., "Fast RSA-Type Cryptosystems Using N-Adic Expansion," Advances in Technology—Crypto '97, LNCS 1294, pp. 372-384, 1997.
Wiener, M., "Cryptanalysis of Short RSA Secret Exponents," 1989.
U.S. Appl. No. 10/850,827, filed May 20, 2004, Koyfman.
Wagner, Neal R., "The Laws of Cryptography": The RSA Cryptosystem, <http://www.cs.utsa.edu/~wagner/laws/RSA.html>, no date provided.
Alteon Web Systems: "The Next Step in Server Loading Balancing" Nov. 1999, Retrieved from the Internet: URL:http:/www.nortelnetworks.com/products/library/collateral/intel_int/webworking_wp.pdf, Retrieved on Mar. 2, 2004; pp. 4-11.
Alteon Web Systems: "Networking with the Web in Mind" May 1999, Retrieved from the Internet: URL:http:/www.nortelnetworks.com/products/library/collateral/intel_int/webworking_wp.pdf, Retrieved on Mar. 2, 2004; p. 1, pp. 3-7.
Boneh, D., "Twenty Years of Attacks on the RSA Cyrptosystem," Notices of the AMS, vol. 46, No. 2, pp. 203-213, 1999.
Boneh, et al., "An Attack on RSA Given a Small Fraction of the Private Key Bits," Asiacrypt '98, LNCS 1514, pp. 25-34, 1998.
Boneh, et al., "Cryptanalysis of RSA with Private Key $d$ Less than $N^{0.292}$," (extended abstract), 1999.
Boneh, et al., "Efficient Generation of Shared RSA Keys," (extended abstract), no date provided.
Durfee, G., et al., "Cryptanalysis of the RSA Schemes with Short Secret Exponent from Asiacrypt '99," Asiacrypt 2000, LNCS 1976, pp. 14-29, 2000.
Fiat, A. "Batch RSA, (digital signatures and public key krypto-systems)" Advances in Crytology—Cryto '89 Proceedings Aug. 20-24, 1989, Springer-Verlag.
Großschädl, J., et al., "The Chinese Remainder Theorem and its Application in a High-Speed RSA Crypto Chip," 2000.
Herda, S., "Non-repudiation: Constituting evidence and proof in digital cooperation," Computer Standards and Interfaces, Elsevier Sequoia, Lausanne, CH, 17:1 (69-79) 1995.
Immerman, N., "Homework 4 with Extensive Hints," 2000.

* cited by examiner

| Row ID | First Name | Last Name | DOB |
|---|---|---|---|
| 1 | Andrew | Koyfman | 3/15/85 |
| 2 | Brian | Coleman | 3/21/60 |
| . | . | . | . |
| . | . | . | . |
| . | . | . | . |
| n | Sharyl | Brown | 9/15/79 |

US 7,519,835 B2

ENCRYPTED TABLE INDEXES AND SEARCHING ENCRYPTED TABLES

TECHNICAL FIELD

The invention relates to encrypted database search mechanisms. In particular, the present invention teaches building encrypted database indexes and fast searching of encrypted database tables using encrypted database indexes.

BACKGROUND OF THE INVENTION

Computer databases are a common mechanism for storing vast amounts of information on computer systems while providing easy access to users. A typical database is an organized collection of related information stored as "records" having "fields" of information. For example, a customer database may have a record for each customer. Each record contains fields designating specifics about the customer, such as first name, last name, date of birth, home address, credit information, credit card information, social security number, customer history, and the like. As can be seen, much of this information is of a sensitive nature and thus databases are often maintained in an encrypted form.

A database management system (DBMS) typically provides and manages access to the database (i.e., the data actually stored on a storage device) for the users of the system. In essence, the DBMS shields the database user from knowing or even caring about underlying details involved in management of the database. Typically, all requests from users for access to the data are processed by the DBMS. For example, records can be searched, information may be added or removed from data files, information retrieved from, or updated in, such files, and so forth, all without user knowledge of underlying system implementation.

In this manner, the DBMS provides users with a conceptual view of the database that is removed from the implementation level. The general construction and operation of a database management system is known in the art. See e.g., Date, C., "An Introduction to Database Systems, Volume I and II," Addison Wesley, 1990; the disclosure of which is hereby incorporated by reference.

For enhancing the speed in which the DBMS searches, stores, retrieves, and presents particular data records, the DBMS usually maintains database indexes on one or more database tables. Database tables may include the complete contents of a database, but usually the DBMS creates one or more tables consisting only of those records that are most frequently accessed. Take for example FIG. 2 illustrating a table 30 having N records arranged in columns of fields which are row id 32, first name 34, last name 36, and date of birth (DOB) 38. One can readily appreciate that within a customer database, this type of information may be frequently accessed and searched.

Although the data in a database table may be of a sensitive nature, to enable fast searching such database tables are not typically encrypted. To search an encrypted table, the DBMS would first have to expend computing power decrypting the table, then perform the search and finally encrypt (again) the table. Hence, encrypting the database table prohibits fast searching as currently there is no mechanism for searching encrypted data.

A database index, typically maintained as a B-Tree (or B+Tree) data structure, allows the records of a non-sorted database table to be organized via nodes of the database index in many different ways, depending on a particular user's needs. A database index may be constructed as a single file storing ordered nodes of index key values together with unique index data. The index key values are a data quantity composed of one or more fields from a record which are used to arrange (logically) the database table records in some desired order (index expression). The index data are unique pointers or identifiers to the actual storage location of each record in the database table. Both are referred to internally by the system for locating and displaying records in a database table. Like the tables, for ease of searching and data management, current schemes require that the data within the database index be maintained in an unsecured transparent form.

FIG. 3 illustrates one type of b-tree index, a binary tree index 50, according the prior art. The binary tree index 50 includes a plurality of nodes 52 arranged in a hierarchical order. In the example of FIG. 3, each node 52 includes a transparent index key 54 and a transparent index data 56. The transparent index key 54 contains data that is used for hierarchical ordering of the index 50. In the case of the table 30, e.g., data from the DOB column 38 would be well suited for use as the transparent index key 54, the index 50 arranged according to age. The transparent index data 56 contains the payload data of the node 52. In the case of the table 30, e.g., data from the row id column 32 would be well suited for use as the contents of the transparent index data 56.

Searching for a particular record in a B-Tree index occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the record ultimately desired. Ultimately, a search will end at a particular leaf node which will, in turn, point to (i.e., will store a pointer to or identifier for) a particular data record for the key value sought. Alternatively, the leaf nodes may for "clustered indexes" store the actual data of the data records on the leaf nodes themselves.

An index allows a database server to find and retrieve specific rows much faster than it could without using the index. A sequential or linear scan from the beginning of a database table, comparing each record along the way, is exceedingly slow compared to using an index. There, all of the blocks of records would have to be visited until the record sought is finally located. For a table of even moderate size, such an approach yields unacceptable performance. As a result, virtually all modern-day relational database systems employ B-Tree indexes or a variant.

FIG. 1 illustrates a method 10 for generating and searching a table index utilizing transparent data according to the prior art. An initial step 12 populates a transparent database with a variety of data, including sensitive and possibly non-sensitive data. A next step 14 generates one or more transparent tables consisting of commonly searched data extracted from the transparent database. See FIG. 2 and the preceding description for more details on tables.

Continuing on with the method 10 of FIG. 1, a next step 14 generates a transparent index suitable for searching a transparent table. Once indexes have been formed, a step 18 provides for fast searching of the transparent tables utilizing the indexes formed. Then a step 20 encrypts the database for permanent storage.

The methods involving database tables and indexes, like that of FIG. 1, provide for fast table searching of data extracted from a database. Although indexes are widely used to improve DBMS performance, they expose sensitive data to attack. This is because searching methods of the prior art require that the database tables and database indexes be maintained in a transparent format in order to facilitate fast searching. Encrypting the indexes and tables would secure such data, but the computing power required to encrypt and decrypt these tables and indexes whole scale each time a search is required renders such a method unfeasible.

SUMMARY OF THE INVENTION

The present invention teaches a variety of methods for building and searching secure, indexed database tables. Sensitive portions of the database tables and database indexes are encrypted, ordered and searched according to Boolean functions arranged to work with encrypted data. Also disclosed is a database management system that allows authorized users to build and search encrypted tables.

BRIEF DESCRIPTION OF THE DRAWINGS

Prior Art

Prior Art

Prior Art

DETAILED DESCRIPTION

Figure 1:
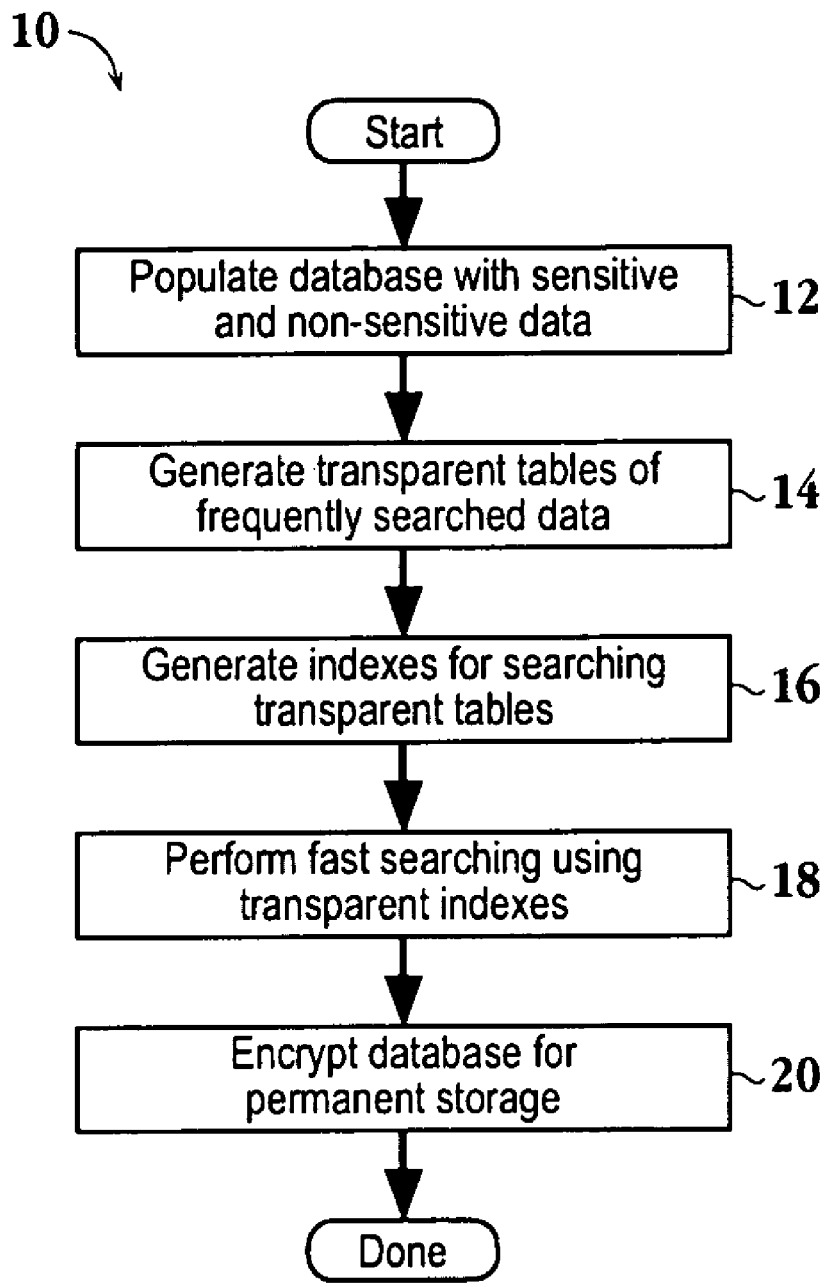
FIG. 1 is a flow chart for a method for performing indexed based table searching.
Figures 2, 3:
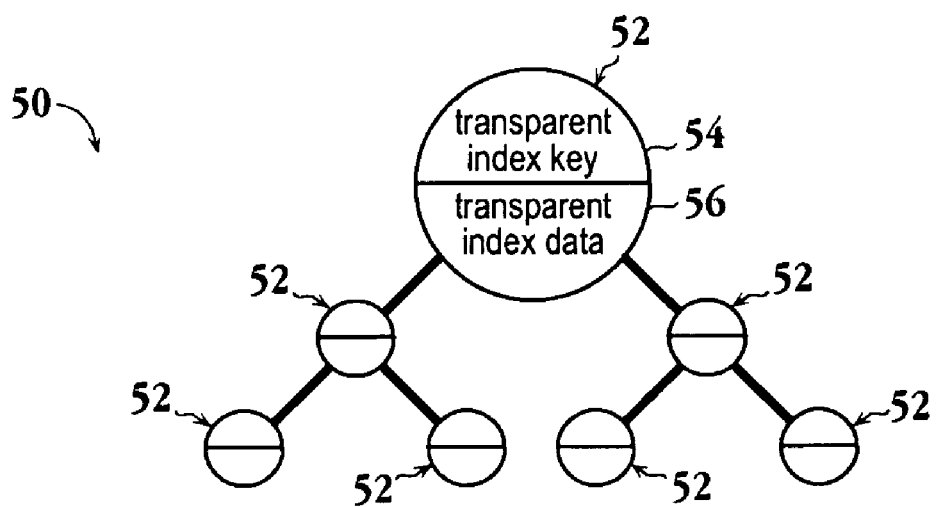
FIG. 2 shows a table of commonly searched data extracted from a database.
FIG. 3 shows a b-tree for the table of FIG. 2.

FIGS. 1-3 show prior art.

Figure 4:
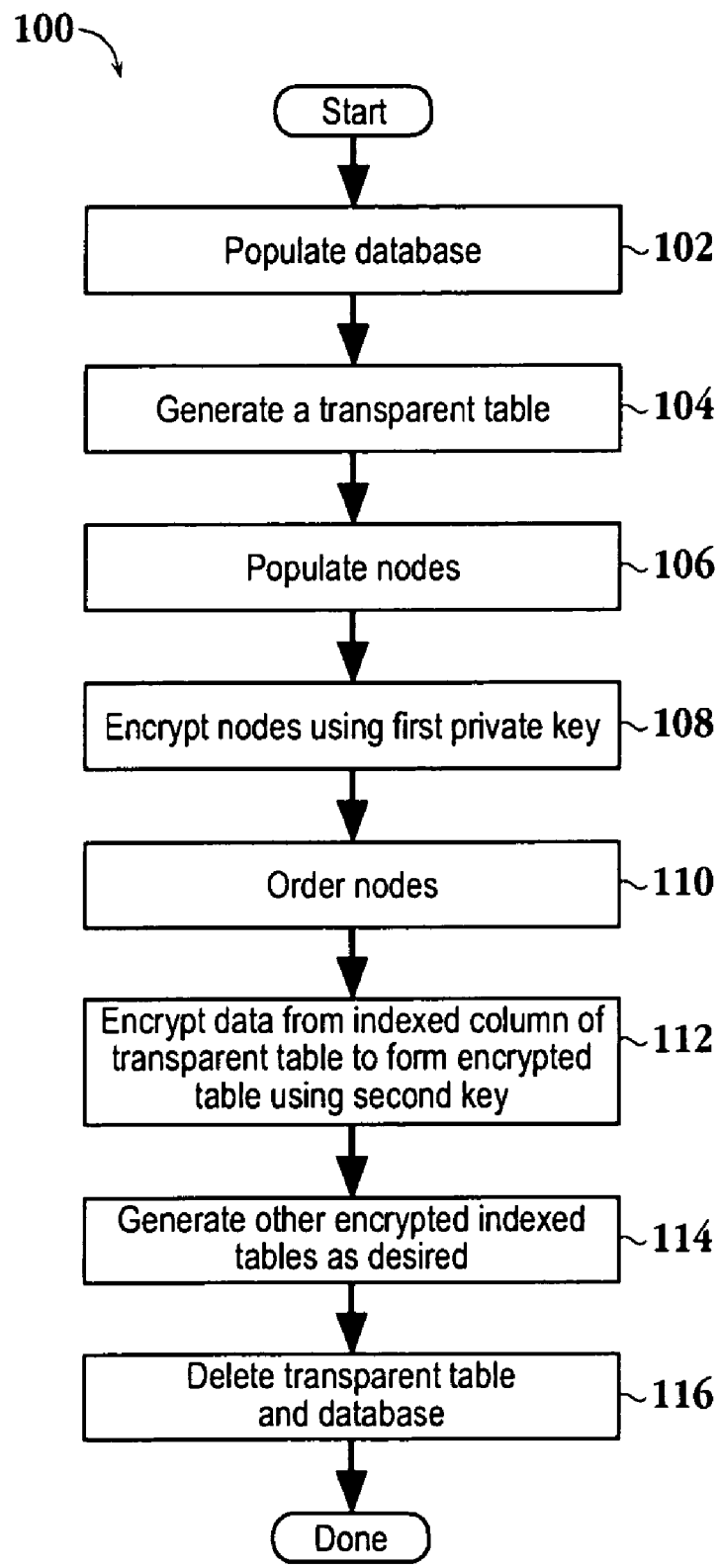
FIG. 4 is a flow chart for a method of forming a searchable and encrypted database index in accordance with one aspect of the present invention.

FIG. 4 illustrates a method 100 for building a searchable encrypted index according to one aspect of the present invention. The database index may be a binary tree, a b-tree, or other suitable data structure. In one embodiment of the present invention, the database index is constructed as a single file storing index key values together with unique index data. The index key values are a data quantity composed of one or more fields from a record which are used to arrange (logically) the database table records in some desired order (index expression). The index data are unique pointers or identifiers to the actual storage location of each record in the database table.

An initial step 102 populates a database with transparent data. A next step 104 generates a transparent database table from data extracted from the database. Typically a set of database tables for different types of information and searching are formed. The transparent database may be like the database table 30 of Prior Art FIG. 2. The method 100 contemplates forming an index for one column of fields taken from the database table. However, those skilled in the art will readily recognize how the present invention can operate within more complicated structures.

A next step 106 populates a set of nodes with transparent data taken from the database table formed in step 104. In forming the set of nodes, the data contained in the indexed column (i.e., the column of fields that will be searchable by the index formed by method 100) serves as the index key values, and the row ID associated with each field is the index data. Each index key and index data form a node.

A step 108 encrypts each node using a first private key. The present invention contemplates encrypting at least the index key values of each node, although there is benefit in also encrypting the row ID values as will be described in the following paragraph. The index key values consist of sensitive information, and thus require encryption.

The row ID values, although not inherently sensitive information, provide an indirect route to sensitive information and are therefore subject to attack. By way of explanation, encrypting the row ID values reduces the amount of information that is transparent to parties doing a known plain text attack. This is particularly true when the indexed data has relevance to some particular transparent data found in the database table. For example, there is little benefit in an attacker determining that an undeterminable person has a particular birth date. However, knowing the name of the person associated with the birth date has value. An attacker that determines the values of some of the index keys in the database index knows the comparison for the remaining database keys. By way of example, if an attacker knows where in the database index lies the values of Jan. 22, 1990 and Jan. 24, 1990, then the attacker can determine which entries lie in-between, i.e., Jan. 23, 1990. However, when the row ID values are encrypted, the attacker cannot associate the entries in between with the correct identity.

Once the nodes have been encrypted in step 108, a next step 110 orders the nodes. Ordering is generally done with a "less than" comparitor associated with the particular data type being ordered. For example, in ordering integers the less than comparitor is a simple Boolean '<' operation. The present invention contemplates generation of a "less than" comparitor function designed for use with encrypted data. One suitable pseudocode implementation follows:

Operator Less Than (A, B)
A'=Decrypt(A);
B'=Decrypt(B);
Perform Less Then Operation appropriate to A', B' data types.

Of course, other Boolean operators such as '>' can be used to arrange the nodes. In light of the present teaching, implementing such Boolean operators for use in the fast searching mechanisms of the present invention will be readily apparent to those skilled in the art.

Figures 5, 6:
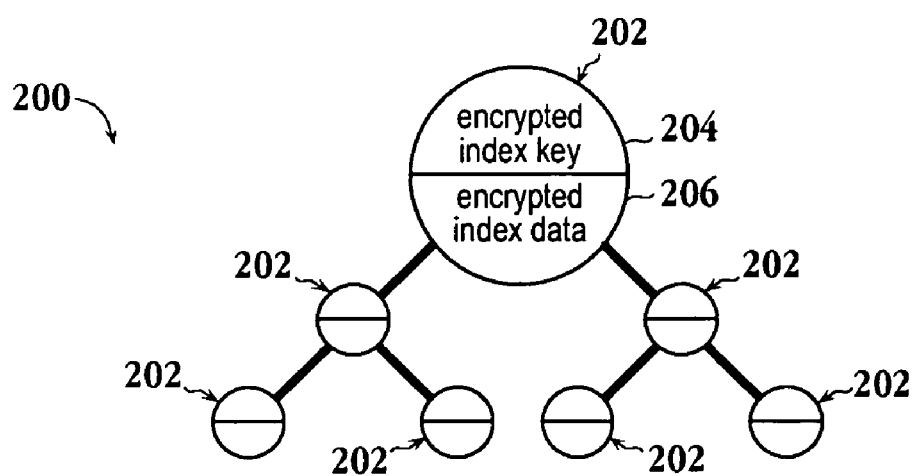
FIG. 5 illustrates an encrypted table according to one embodiment of the present invention.
FIG. 6 illustrates an encrypted and ordered binary tree index in accordance with one embodiment of the present invention.

FIG. 6 illustrates one example binary tree index 200 in accordance with one embodiment of the present invention. The database index 200 is in an ordered format and includes a plurality of nodes 202. However, the ordering of the nodes is meaningless unless one has access to the encryption functionality. Each node 202 includes an index key 204 and an index data 206. The embodiment of FIG. 6 contemplates encrypting both the index key 204 and the index data 206. Other embodiments of the present invention contemplate encrypting only the index key.

With further reference to FIG. 4, once the database index has been formed in encrypted and ordered format, like that shown in FIG. 6, a next step 110 encrypts the data fields of the indexed column of the transparent database table and forms a database table that is at least partially encrypted. FIG. 5 illustrates an example with a table 150 having a row ID column 152, a first name column 154, a last name column 156, and an encrypted DOB column 158. Preferably the database table fields are encrypted using a second private key, thus adding a layer of security so that encrypted information from the database index cannot be used to imply ordering on the database table.

Now that the database table and the database index are formed, a step 114 generates other encrypted database tables and database indexes as desired. As will be appreciated, the database may be fully represented in a plurality of indexed database tables that are encrypted as desired. The different tables are useful for fast searching on different types of data. The number of tables is application specific. A final step 116 then deletes the transparent database table and the transparent database. The DBMS may now utilize the encrypted index table for searching the encrypted table.

Figure 7:
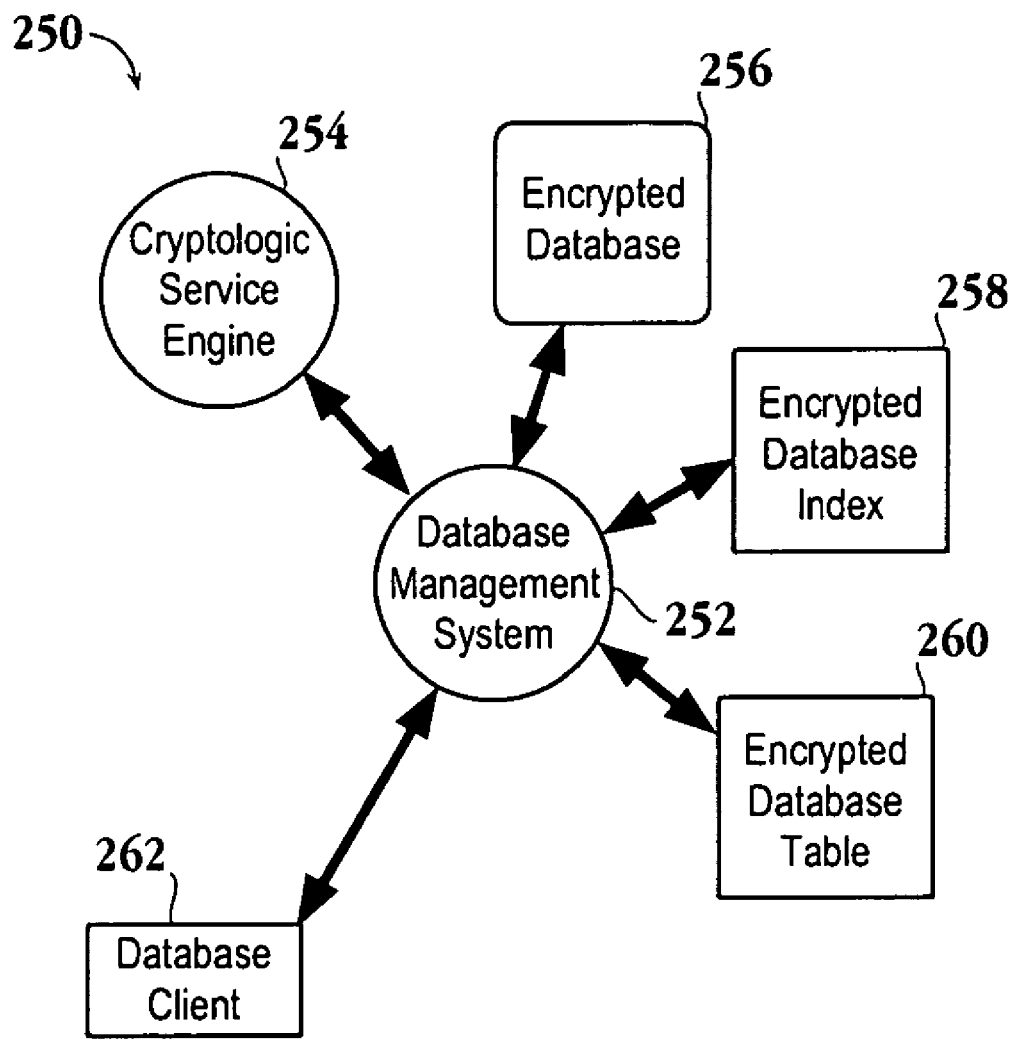
FIG. 7 is a block diagram of a computer system in accordance with yet another embodiment of the present invention.

FIG. 7 illustrates a computer system 250 in accordance with yet another embodiment of the present invention. The computer system 250 includes a database management system (DBMS) 252, a cryptographic service engine 254, an encrypted database 256, an encrypted database index 258, an encrypted database table 260, and a database client 262. The DBMS 252 provides and manages access to the database 256 for the database client 262. All requests for access are processed by the DBMS 252. The cryptographic service engine 254 is used by the DBMS 252 to perform encryption and decryption functions. While shown as a distinct process, the cryptographic service engine 254 may well be a component of the DBMS 252.

The encrypted database index 258 and the encrypted database 260 are built and operate as described above with reference to FIGS. 4-6. As will be appreciated, the computer system 250 may be distributed across a network and a plurality of computers. Remote clients may access the DBMS 252 through the use of secure protocols such as SSL or TSL.

As performed in the prior art, searching for a particular record in a B-Tree index (or other tree like index) occurs by traversing a particular path in the tree. To find a record with a particular key value, one would maneuver through the tree comparing key values stored at each node visited with the key value sought. Unlike the prior art, the comparison functions here would involve decryption functions as described above.

Traversing the database index of the present invention would only be possible if the requesting user has authority to perform the necessary decryption functions. The results of each comparison operation, in conjunction with a decrypted form of the pointers stored with each node, indicate which path to take through the tree to reach the desired record(s). Ultimately, a search will end at a particular leaf node, which will, in turn, point to (i.e., store a pointer to or identifier for) a particular data record for the key value sought. Alternatively, the leaf nodes may for "clustered indexes" store the actual data of the data records on the leaf nodes themselves. In any event, the index and the tables in their encrypted format prevent the attacker from easily obtaining sensitive information.

What is claimed is:

1. A computer-implemented method for building a database having no un-encrypted database table, said method comprising: forming a transparent table including at least a row ID column having a plurality of row ID fields, and a sensitive data column having a plurality of sensitive data fields;
    populating a plurality of nodes with the transparent table, each node having both an index key being data from a unique one of said plurality of sensitive data fields and an index data being data from a unique one of said plurality of row ID fields, whereby said nodes include a plurality of index keys and a plurality of index data;
    encrypting said plurality of index keys found in said plurality of nodes;
    ordering said plurality of nodes according to values of said encrypted index keys;
    encrypting the plurality of sensitive data fields and forming an at least partially encrypted database table in the database; deleting the transparent table.

2. A computer-implemented method as recited in claim 1, wherein said act of forming a database table includes forming a database table having a plurality of field columns.

3. A computer-implemented method as recited in claim 1, wherein said act of encrypting said plurality of index keys is performed using a first private key.

4. A computer-implemented method as recited in claim 3, further comprising encrypting said plurality of index data using said first private key.

5. A computer-implemented method as recited in claim 1 wherein said act of encrypting the plurality of sensitive data fields uses a second private key.

6. A computer-implemented method as recited in claim 1 further comprising storing said encrypted database table and said encrypted plurality of nodes to a persistent memory.

7. A computer-implemented method as recited in claim 1 wherein said act of ordering said plurality of nodes further comprises:
    receiving data A and B in an encrypted format;
    decrypting A to form A';
    decrypting B to form B';
    performing a "less than" operation appropriate to a common data type of data A' and B'; and returning results from said "less than" operation appropriate to a common data type of data A' and B'.

8. A computer-implemented method as recited in claim 7, further including determining whether an entity requesting an operation of said "less than" function is authorized to perform encryption operations.

9. A computer-implemented method as recited in claim 1 wherein said act of ordering said plurality of nodes further comprises: receiving data A and B in an encrypted format; decrypting A to form A'; decrypting B to form B'; performing a "greater than" operation appropriate to a common data type of data
    A' and B'; and returning results from said "greater than" operation appropriate to a common data type of data A' and B'.

10. A computer-implemented secure index for indexing an at least partially encrypted database table, said secure index searchable only by users authorized to utilize encryption functions available on a computer system, said secure index comprising:
    a plurality of nodes, each node including an index key and an index data, each index key being encrypted, decrypted data from each index key providing meaningful information, and each index data identifying a storage location within said database table in an encrypted database having no un-encrypted database table; and
    wherein said plurality of nodes are logically ordered according to value of said encrypted index key of each said node in a manner searchable only through decryption.

11. A secure index as recited in claim 10, wherein each of said index data are encrypted according to a first private encryption key.

12. A secure index as recited in claim 11, wherein data found in fields in said at least partially encrypted database table corresponding to said index data is encrypted according to a second private encryption key different from said first private encryption key.

13. A method for searching an at least partially encrypted database table via a secure index, said secure index having a plurality of nodes, each node including an index key and an index data, each index key being encrypted, decrypted data from each index key providing meaningful information, and each index data identifying a storage location within said database table in an encrypted database having no un-encrypted database table, and wherein said plurality of nodes is logically ordered according to value of said encrypted index key of each said node in a manner searchable only through decryption, said method comprising:

receiving a request to search said secure index from a user;

determining whether said user is authorized to utilize encryption functions;

when said user is authorized to utilize encryption functions, performing said requested search using one or more comparison functions operable to decrypt indexed and encrypted data.

14. A computer system comprising: an encrypted database having no un-encrypted database table; a database table in the encrypted database including at least a row ID column having a plurality of row ID fields, and a sensitive data column having a plurality of sensitive data fields, said row ID column and said sensitive data column encrypted;

a database index corresponding to said database table, said database index including a plurality of nodes, each node having both an index key being data from a unique one of said plurality of sensitive data fields and an index data being data from a unique one of said plurality of row ID fields, whereby said nodes include a plurality of index keys and a plurality of index data, said plurality of index keys being encrypted, said plurality of nodes being ordered according to values of said encrypted index keys; and a database management system instantiated on said computer system, said database management system operable to search said database table using said database index.

15. A computer system as recited in claim 14, wherein said computer system further comprises a cryptographic service engine operable to perform cryptographic functions as requested by said database management system.

16. A computer system as recited in claim 15, wherein said cryptographic service engine provides computer executable instructions for a "less than" comparitor function useful for comparing two encrypted data A and B, said computer executable instructions including:

receiving data A and B in an encrypted format;

decrypting A to form A';

decrypting B to form B';

performing a "less than" operation appropriate to a common data type of data A' and B'; and returning results from said "less than" operation appropriate to a common data type of data A' and B'.

17. A computer system as recited in claim 15, further comprising an cryptographic API which provides an interface to said cryptographic service engine for applications running on said computer system.

\* \* \* \* \*